United States Patent Office 3,814,735
Patented June 4, 1974

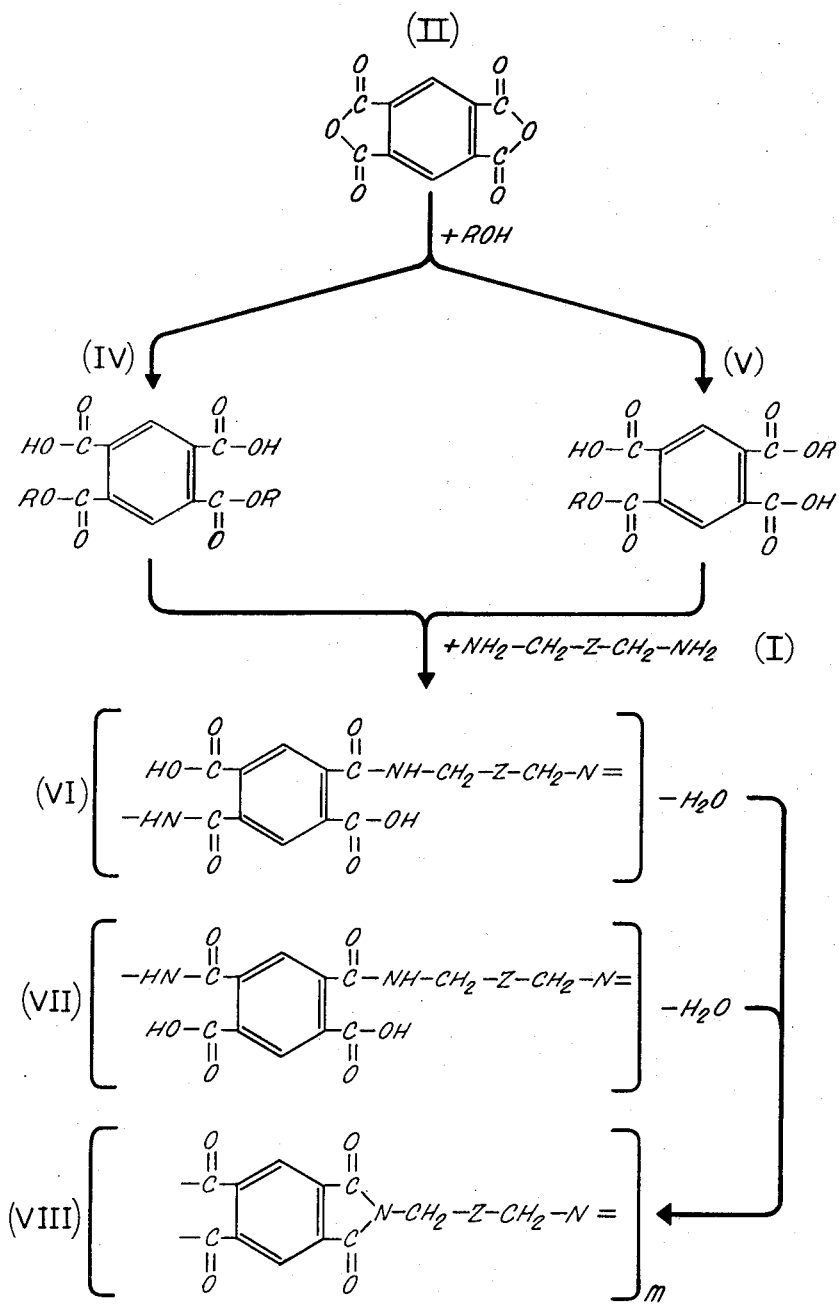

3,814,735
POLYIMIDE POLYMER OF ALKYLADAMANTANE DIAMINE AND POLYANHYDRIDE
Robert M. Thompson, Wilmington, Del., assignor to Sun Research and Development Co., Marcus Hook, Pa.
Continuation-in-part of abandoned application Ser. No. 191,706, Oct. 22, 1971. This application Nov. 15, 1972, Ser. No. 306,764
Int. Cl. C08g 20/32
U.S. Cl. 260—65                                   7 Claims

ABSTRACT OF THE DISCLOSURE

A novel polymer is prepared by the condensation of an alkyladamantane diamine of the following structure:

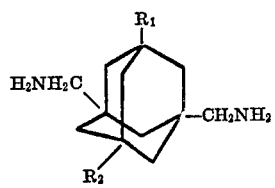

where each of $R_1$ and $R_2$ is an alkyl radical having 1-10 carbon atoms and one of the following: dianhydride of 1,2,4,5-benzene-tetracarboxylic acid and 3,4,3',4'-benzophenonetetracarboxylic dianhydride. The resulting polymer is thermally stable at high temperatures and is useful as a fiber, film or sheet.

CROSS REFERENCE TO RELATED APPLICATIONS

This application is a continuation-in-part of copending application Ser. No. 191,706, filed Oct. 22, 1971, now abandoned Nov. 20, 1972. The latter is copending with applicant's applications, Ser. Nos. 191,700, now abandoned May 22, 1973; 191,826, now allowed; 191,827 and 191,833, which were also filed Oct. 22, 1971. The first of these four aforementioned copending applications relates to a method for preparing a water white polyimide polymer from an alkyladamantane diamine; the second to the preparation of an alkyladamantane diamine from an alkyladamantane diacid; the third to the preparation of an alkyladamantane dinitrile from an alkyladamantane diacid, the fourth to a novel polyamide polymer prepared from an alkyladamantane diamine.

BACKGROUND OF THE INVENTION

Generally, a condensation polymer is one derived from two monomeric starting materials and is formed by the elimination of water or the equivalent. Thus as used herein, the term condensation polymer refers to a dianhydride and a diamine condensing to form a novel polyimide having the following repeating unit: tetravalent dianhydride radical-divalent diamine radical. The term "tetravalent dianhydride" radical refers to one of the following:

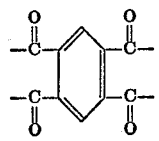 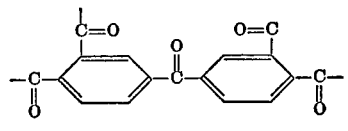

and the term "divalent diamine" radical refers to $$=N-CH_2-Z-CH_2-N=$$

wherein Z is

and where each of $R_1$ and $R_2$ is an alkyl radical having 1-10 carbon atoms.

The prior art (U.S. Pat. No. 3,342,774 to E. F. Hoegger, Sept. 19, 1967) discloses that certain polyimide polymers can be directly prepared as a result of a reaction between particular aromatic dianhydrides and particular organic diamines. However, at least one of the related prior art polyimide polymers does not have the relatively excellent resistance to thermal degradation shown by the novel polyimide polymer of present invention. Comparative data is presented hereinafter.

SUMMARY OF THE INVENTION

The present invention relates to a novel polyimide polymer. More particularly the polymer consists essentially of repeating units of the following structural unit:

$$[=X=N=CH_2-Z-CH_2-N=]_m$$

wherein $m$ is an integer of from 2 to 100, and X is one of the following:

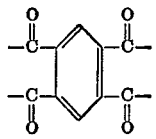 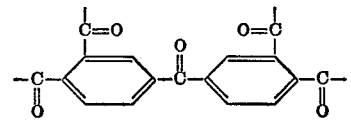

and Z is

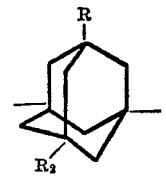

where each of $R_1$ and $R_2$ is an alkyl radical having 1-10 carbon atoms. The aforementioned novel polyimide can be prepared from certain alkyladamantane diamines and on certain dianhydrides via a condensation reaction.

BRIEF DESCRIPTION OF THE FIGURE

The figure presents the chemical equations which illustrate the process for preparing the polyimide claimed herein. This figure shows the use of the dianhydride of 1,2,4,5-benzene-tetracarboxylic acid as one of the monomeric reactants; 3,4,3',4' - benzophenonetetracarboxylic anhydride will react in an analogous manner.

DESCRIPTION OF THE INVENTION

The polyimide polymer of the present invention can be described as a polymer prepared in part from an alkyladamantane diamine of the following structure:

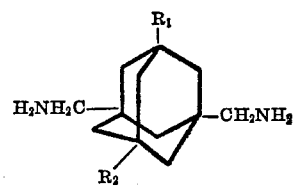

(I)

The aforementioned alkyladamantane diamine can be prepared by the method illustrated by the following equations:

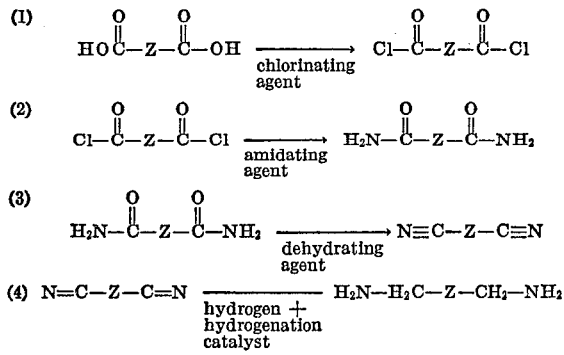

wherein Z represents

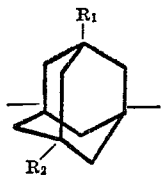

and each of $R_1$ and $R_2$ is an alkyl radical having 1-10 carbon atoms. Preferred alkyl radicals having 1-2 carbon atoms.

Preparation of an alkyladamantane diacid, which is shown as the reactant in the aforementioned equation 1, and in particular 1,3-dimethyladamantane-5,7-dicarboxylic acid, is described in U.S. Pat. No. 3,356,719, issued Dec. 5, 1967, A. Schneider et al.

The reactant alkyladamantane diacid can be only one such diacid, for example, 1,3-dimethyladamantane-5,7-dicarboxylic acid, 1-methyl-3-ethyladamantane-5,7-dicarboxylic acid, 1 pentyl-3-hexyladamantane-5,7-dicarboxylic acid, etc., or a mixture of such acids, for example 1,3-dimethyladamantane-5,7-dicarboxylic acid and 1-methyl,3-ethyladamantane-5,7-dicarboxylic acid and the like.

Initially, an alkyladamantane diacid is contacted with a suitable chlorinating agent; see aforementioned equation 1. Examples of such agents are $SOCl_2$, $POCl_3$ and $PCl_5$; these are preferred. $SOCl_2$ is particularly useful since its reaction products, i.e., $SO_2$ and HCl are gaseous, thereby facilitating their removal from the solid acid chloride and any unreacted diacid. Also, $SOCl_2$ as a chlorinating agent, has the advantage of having a boiling point of about 80° C. This low boiling point means any excess $SOCl_2$ can be removed efficiently by heating the reaction mixture with steam.

The mole ratio of chlorinating agent to the alkyladamantane diacid used in the first contacting step is not critical and can be as low as 0.01 or as high as 100. If an excess amount, i.e., an amount greater than the estimated necessary by stoichiometric calculations to react with all the diacid, of chlorinating agent is used, then the excess remaining after the chlorination reaction can be removed. However, balancing increasing the yield after chlorination versus reducing the amount of excess agent to be removed, a more convenient ratio of agent to diacid is 0.1 to 10 and preferably, 0.9 to 5. Thus, the amount of chlorinating agent used to contact the diacid should be sufficient to convert most, preferably all, of the diacid to the corresponding acid chloride.

The temperature at which the alkyladamantane diacid contacts the chlorinating agent can be between 0° C. and the decomposition temperature of the diacid. A temperature range of about 40°–140° C. is preferred with 60° C.–130° C. most preferred.

The time required for converting the diacid to the acid chloride depends on such variables as the temperature of contacting, the amount of mixing, if any, and the quantity of diacid being treated.

The acid chloride resulting from the contacting of the diacid and chlorinating agent before further processing, can be separated, and if necessary, purified further to remove any undesired by-products or unreacted diacid.

The next step is the amidation of the acid chloride, i.e., the aforementioned equation 2. Two methods described hereinafter are workable. One method employs the use of a solvent and $NH_3$; the other uses $NH_4OH$.

The solvent method is as follows: The resulting acid chloride, with or without prior purification, is dissolved in a suitable solvent. A suitable solvent is one which does not substantially react with the acid chloride or the amidating agent; an unsatisfactory solvent is one containing an —OH group, e.g., water or alcohol. Suitable solvents include ethers and aromatic solvents such as benzene and toluene. The lower boiling solvents are particularly useful since they can be easily removed by evaporation at lower temperatures. A sufficient quantity of solvent to dissolve substantially all of the acid chloride is generally employed.

After the aforementioned solution is formed, it is contacted with $NH_3$. The contacting can be performed several ways, e.g., bubbling $NH_3$ through the solution. However, because the formation of the diamide is exothermic, heat removal is required. Thus, while the amidating step can be conducted at 0° C.–50° C., 0° C.–30° C. is preferred, and in particular, 0° C.–20° C.

The time required for converting the acid chloride to the diamide depends on such variables as the rate at which the $NH_3$ contacts the mixture and the quantity of mixture being treated.

An alternate amidating step employs $NH_4OH$; concentrated $NH_4OH$ is preferred. The acid chloride contacts the concentrated $NH_4OH$. The resulting $NH_4Cl$ remains dissolved in the water whereas the diamide, which is insoluble, precipitates out.

In either of the aforementioned amidations, the mole ratio of amidating agent to dichloride used in either of the amidations is not critical and can be as low as 0.01 or as high as 100. If an excess amount; i.e., an amount greater than that estimated necessary by stoichiometric calculations to react with all the dichloride is used, then the excess remaining after the amidation can be removed. However, balancing increasing the yield after amidations versus reducing the amount of excess agent to be removed, a more convenient mole ratio of agent to diacid is 0.1–10.0 and preferably 0.9–5.0. In either of the amidations, the amount of amidating agent used to contact the dichloride should be sufficient to convert most, preferably all, of the dichloride to the corresponding diamide.

The resulting diamide can be treated by known methods to remove any unreacted acid chloride, and/or unwanted by-products and/or to neutralize any $NH_3$ or $NH_4OH$ remaining with the diamide.

As referred to in the aforementioned equation 3, the diamide is then contacted with a suitable dehydrating agent. Some examples of such agents are $SOCl_2$, $P_2O_5$, $POCl_3$, $PCl_5$, $NH_4OSO_2NH_2$ and $C_6H_4(CO)_2O$; these are preferred. Normally, the diamide is dissolved in a suitable aromatic solvent such as benzene or toluene. Lower boiling solvents are particularly useful because of their ease of evaporation. To the resulting solution sufficient dehydrating agent is added to convert the diamide to the dinitrile. $SOCl_2$ as a dehydrating agent is particularly useful since it forms gaseous $SO_2$ and HCl, both of which evolved from the mixture.

The mole ratio of dehydrating agent to diamide used is not critical and can range from as low as 0.01 to as high as 100.0. If an excess amount, i.e., an amount greater than that estimated necessary by stoichiometric calculations to react with all the diamide is used, then the excess remaining after the dehydration can be removed.

However, balancing increasing the yield after dehydration versus reducing the amount of excess agent to be removed, a more convenient mole ratio of agent to diamide is 0.1–10.0 and preferably 0.9–5.0. The amount of dehydrating agent used to contact the diamide should be sufficient to convert most, preferably all, of the diamide to the corersponding dinitrile.

The temperature at which the diamide is contacted by a suitable dehydrating agent is between 0° C. and the decomposition temperature of the diamide. A temperature range of about 40° C.–150° C. is preferred; a range of about 60° C.–130° C. is most preferred.

The time required for converting substantially all diamide to the dinitrile depends on such variables as the temperature of contacting and the quantity of diamide being converted.

After sufficient time has lapsed to convert the diamide to the dinitrile, the latter can be separated from the reaction mixture. This separation can be desirable and can be achieved in numerous ways. If excess dehydrating agent is used, the reaction mixture is made basic by a suitable reactant. Thus, for example, if the dehydrating agent is $SOCl_2$, it is made basic with a dilute KOH solution. And, after separation of the water layer from the aromatic solvent, the dinitrile will crystallize out upon standing. An alternative is to evaporate the lower boiling solvent, this is particularly useful if no excess dehydrating agent was used.

The resulting crystallized dinitrile can also be separated from the solvent by filtration or decanting. Then the dinitrile can be recrystallized from a suitable solvent, e.g., benzene-hexane solution, to remove any undesirable coproducts or unreacted starting material.

As referred to in the aforementioned equation 4, the dinitrile is then contacted with hydrogen in the presence of a suitable hydrogenation catalyst. Some examples of suitable catalysts are Raney nickel, Raney cobalt, rhodium on carbon, platinum on carbon and palladium on carbon; these are preferred. The hydrogenation step can occur at a wide range of pressure, i.e., from essentially atmospheric to many thousands atmospheres. Some positive pressure is preferred since this helps the reaction to completion. A preferred pressure range is 100–5000 p.s.i., with 100–1000 p.s.i. being most preferred.

The temperature at which the dinitrile is contacted with hydrogen in the presence of a suitable catalyst is between 0° C. and the decomposition temperature of the dinitrile. A temperature range of about 40° C.–130° C. is preferred; a range of about 50° C.–100° C. is most preferred.

The hydrogenation step can take place in a suitable solvent. The suitable solvent is one that does not enter into a reaction with the dinitrile or the diamine and does not react with the hydrogenation catalyst being used. A further requirement for the suitable solvent is that both the starting dinitrile and the diamine product be soluble thereon. Another requirement can be that a nitrogen-containing material such as $NH_3$ be readily soluble in the solvent. If a solvent is used and it is saturated with $NH_3$, the formation of secondary amines is reduced. Examples of such suitable solvents are methanol, ethanol, and isopropanol. Such solvents must be absolutely free of water.

The time required for hydrogenating substantially all the dinitrile to the diamine depends on such variables as the temperature of contacting and the quantity of the dinitrile being hydrogenated.

After sufficient time has lapsed to hydrogenate the dinitrile to the diamine, the latter is separated from the reaction mixture and in particular, the catalyst and any solvent that may have been used.

The diamine can be refined to remove any unreacted dinitrile or any coproducts formed during the hydrogenation step. The refining step can be crystallization, filtration, or distillation. Alternatively, depending on the final use, the diamine may not be refined.

The other reactant used to prepare the polymer of present invention is one of the following: dianhydride of 1,2,4,5-benzene-tetracarboxylic acid and 3,4,3',4'-benzophenone tetracarboxylic dianhydride. These two dianhydrides, for convenience, are referred to herein as PMDA (II), and 3,4DA (III), respectively. The structures representing these two dianhydrides are as follows:

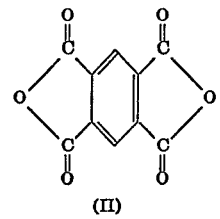

(II)

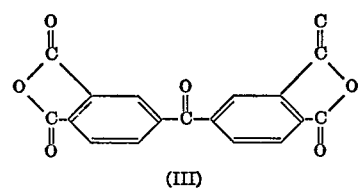

(III)

A process to prepare the novel polymer, wherein the dianhydride is, for example, PMDA, is illustrated by the chemical equations shown in the accompanying Figure.

As shown in the Figure, the dianhydride is contacted with a suitable alcohol. Examples of such alcohols are the monohydric hydrocarbon alcohols such as methyl, ethyl, n-propyl, isopropyl, n-butyl alcohol and t-butyl. A preferable alcohol is one with a lower boiling point and a minimum economic value, methyl alcohol being one example. The alcohol must be free of water, the latter would react with the dianhydride thereby reducing product yields.

The amount of alcohol used to contact the dianhydride should be sufficient to convert most, preferably all, of the dianhydride to the product esters (IV) and (V) as shown in the Figure. The amount of alcohol used can be an excessive amount, i.e., an amount greater than that estimated necessary by stoichiometric calculation, to react with all of the other reactant.

The temperature at which the dianhydride contacts the alcohol is between the melting point of the alcohol and the decomposition temperature of the reactants and products. A temperature range of about 0° C. to about the boiling point of the alcohol is more suitable, with 10° C.–100° C. preferred.

The products esters (IV) and (V) as shown in the Figure, are then contacted with a diamine (I) as shown. Alcohol, not shown, is a coproduct which can be recovered and reused.

The amount of diamine (I) used to contact the diacid should be sufficient to convert most, preferably all, of the esters (IV) and (V) to the reaction compounds (VI) and (VII). An excess amount of diamine (I) can be used.

The temperature at which the diamine (I) and the esters (IV) and (V) are contacted, as shown in the Figure, is between 0° C. and the decomposition temperatures of the reactants and products. A temperature range of about 10° C.–100° C. is more suitable, with 20° C.–75° C. preferred.

As shown in the figure, products (VI), (VII) are heated to form the polymer (VIII). The heat also drives off the formed water. The temperature used to form the polymer and drive off the water is between 0° C. and the decomposition temperature of the novel polymer. A temperature range of about 100° C.–500° C. is more suitable with 200° C.–400° C. preferred.

The polyimide polymer of present invention consists essentially of repeating units of the structural unit (VIII) shown in the figure. The structural unit (VIII) is repeated, as indicated by $m$, from 2 to 100 times. A more suitable range of m is of from 5 to 75 with 10 to 50 preferred.

Surprisingly, the resulting novel polyimide polymer is extremely insensitive to heat. For example, it did not melt at 500° C. and at that temperature, under nitrogen, no thermal degradation is indicated. Even in the presence of oxygen, no thermal degradation is indicated at 370° C. while at 500° C. slight thermal degradation occurs.

Fiber, film or sheets can be formed from the novel polyimide polymer. Also, the polymer can be used to coat articles including irregularly shaped articles. The polymer can also be compression molded into useful articles which have utility in high temperature environments.

In order to further illustrate the invention, the following example is given and the results of comparative runs are described.

EXAMPLE

A measured amount (6.08) grams of PMDA was placed in a 100 milliliter round bottom flask equipped with a drying tube. To the same flask was added 30 milliliters of methanol. The flask was heated on a steam bath until the PMDA went into solution. Then 6.27 grams of 1,3-di(aminomethyl)-5,7-dimethyladamantane was added and the heating was continued. After the diamine dissolved, the remaining methanol was allowed to evaporate. The flask was removed from the steam bath and the resulting white solid was placed in the polymer tube which had a side arm and was equipped with a capillary tube for a nitrogen bleed.

Afterwards, the polymer tube was purged with nitrogen which removed any air. With the nitrogen flowing at a reduced rate, the tube was placed in a heating device. The temperature of the tube was increased to 200° C. After the resultants, i.e., water and methanol ceased to evolve, the temperature was raised to 370° C. After four hours at the latter temperature and after the nitrogen flow was stopped, the tube was removed from the heating device.

The slightly yellow-tinted polyimide polymer which was removed from the tube, was insoluble in all the common solvents, e.g., dimethyl formamide, dimethyl acetamide, acetynitrile, etc. The reason for the slight yellow tint is unknown. Also, the polymer did not melt at 500° C., and under nitrogen showed no signs of thermal degradation. In the presence of oxygen at 500° C., slight thermal degradation occurred but at 370° C., the polymer did not show any thermal degradation.

The use of other alkyladamantane diamines, such as 1,3-di(aminomethyl)-5-methyl, 7-ethyl-adamantane; 1,3-di(aminomethyl)-5-ethyl, 7-propyl-adamantane etc. also will yield analogous polymers. The use of 3,4,3',4'-benzophenonetetracarboxylic dianhydride also will yield similar polymers.

By comparison, the condensation polymer obtained by the condensation of the dianhydride of 1,2,3,4-benzenetetracarboxylic acid and 1,3-di(aminomethyl)-5,7-dimethyl-adamantane had relatively poor thermal stability and was soluble in the common solvents such as dimethyl formamide.

For comparative purposes, a polyimide polymer was prepared using as reactants 1,3 - diamino-5,7-dimethyladamantane and the dianhydride of 1,2,4,5-benzene-tetracarboxylic acid. This resulting polyimide polymer was tested as to thermal degradation. At 390° C., in a sealed tube, this comparative polyimide polymer suffered thermal degradation as indicated by measurements obtained with a differential scanning calorimeter. Yet, at a temperature 110° C. higher (500° C. vs. 390° C.), the novel polyimide polymer of present invention failed to show any thermal degradation thus clearly indicating its extreme insensitivity to heat.

The invention claimed is:

1. A polyimide polymer consisting essentially of repeating units of the following structural unit:

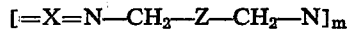

wherein $m$ is an integer of from 2 to 100 and wherein X is one of the following radicals:

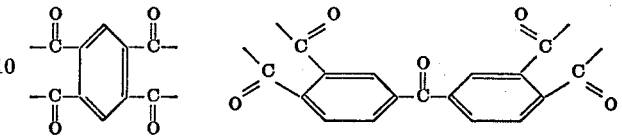

and wherein Z is

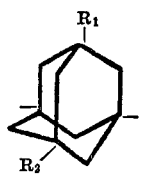

where each of $R_1$ and $R_2$ is an alkyl radical having 1–10 carbon atoms.

2. A polymer according to claim 1 wherein $R_1$ and $R_2$ each are methyl radicals.

3. A polymer according to claim 2 wherein X is

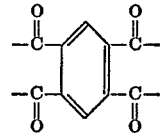

4. A polymer according to claim 2 wherein X is

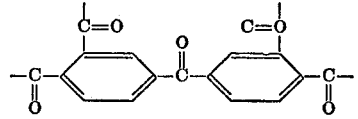

5. A polymer according to claim 1 wherein $R_1$ and $R_2$ each are ethyl radicals.

6. A polymer according to claim 5 wherein X is

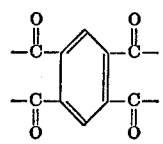

7. A polymer according to claim 5 wherein X is

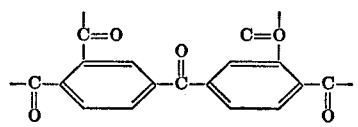

References Cited
UNITED STATES PATENTS

| | | | |
|---|---|---|---|
| 3,342,774 | 9/1967 | Hoegger | 260—47 |
| 3,179,614 | 4/1965 | Edwards | 260—30.2 |
| 3,336,258 | 8/1967 | Angelo et al. | 260—47 |
| 3,464,957 | 9/1967 | Driscoll | 260—78 |

LESTER L. LEE, Primary Examiner

U.S. Cl. X.R.

117—161 P; 260—78 TF